(12) United States Patent  (10) Patent No.: US 7,402,920 B2
Kamiya  (45) Date of Patent: Jul. 22, 2008

(54) ENGINE START CONTROLLING SYSTEM

(75) Inventor: Hodaka Kamiya, Obu (JP)

(73) Assignee: Denso Corporation (JP)

( * ) Notice: Subject to any disclaimer, the term of this patent is extended or adjusted under 35 U.S.C. 154(b) by 230 days.

(21) Appl. No.: 11/477,599

(22) Filed: Jun. 30, 2006

(65) Prior Publication Data

US 2007/0000712 A1 Jan. 4, 2007

(30) Foreign Application Priority Data

Jul. 1, 2005 (JP) ............................. 2005-194078

(51) Int. Cl.
*B60R 22/00* (2006.01)
(52) U.S. Cl. ..................................................... 307/10.6
(58) Field of Classification Search ................. 307/10.6
See application file for complete search history.

(56) References Cited

FOREIGN PATENT DOCUMENTS

JP 8-133016 5/1996

*Primary Examiner*—Robert L. Deberadinis
(74) *Attorney, Agent, or Firm*—Nixon & Vanderhye PC

(57) ABSTRACT

An engine start controlling system for an engine of the vehicle, makes an authentication for a user ID received from a mobile device and authentications for respective device IDs received from respective electrical devices. The system allows, based on a first operation, the engine to start, in a case that all of the authentications for the user ID and the device IDs are successful, and prohibits the engine from starting, in a case that the authentication for the user ID is unsuccessful, irrespective of results of the authentications for the respective device IDs. The engine start controller further allows, based on a second operation, the engine to start, in a case that all of authentications belonging to a selected group are successful and that one authentication belonging to a second group is unsuccessful.

8 Claims, 9 Drawing Sheets

X1: ENGINE START REQUEST

X3: UNLOCK REQUEST

X4: UNLOCK COMPLETION

X5: ENGINE OPERATION PROHIBITION

X7: STARTER ACTIVATION REQUEST

ENGINE ROTATIONAL SPEED

EQUAL TO OR MORE THAN 5 SECONDS

WITHIN 5 SECONDS | EQUAL TO OR MORE THAN 3 SECONDS | WITHIN 5 SECONDS

ENGINE START CONTROLLING SYSTEM

CROSS REFERENCE TO RELATED APPLICATION

This application is based on and incorporates herein by reference Japanese patent application No. 2005-194078 filed on Jul. 1, 2005.

FIELD OF THE INVENTION

The present invention relates to an engine start controlling system.

BACKGROUND OF THE INVENTION

In JP-8-133016A, an engine start system (also called as an immobilizer) for a vehicle is described which controls an engine of the vehicle based on result of comparison between two IDs, one of which is an authentication ID stored in a wireless mobile communicator (which also serves as a vehicle entrance key) and the other one of which is a master ID stored in a device in the vehicle. The engine start system includes an engine control unit for controlling the engine and an immobilizing control unit for controlling the engine control unit based on the result of the comparison. The immobilizing control unit allows the engine control unit to start the engine when the two IDs are identical, that is, when an authentication of the authentication ID is successful. In contrast, the immobilizing control unit prohibits starting the engine when the two IDs are not identical, that is, when the authentication of the authentication ID fails. Thus, the engine start system rejects an improper request for starting the engine which is made by an unauthorized person.

Some criminal acts may be made which compromises the engine start system by replacing the immobilizing control unit with another control unit. As a measure against the criminal acts, an advanced engine start system is provided in which a controller is connected through an on-board communication network with on board electrical device. In the advanced engine start system, a device ID is stored in each of on-board electrical devices having a risk of replacement. In addition, master device IDs for comparison with the respective device IDs are in the controller. The advanced engine start system performs a device individual authentication function (also referred to as multi-device authentication function) in which the controller makes authentications between the device IDs and the respective master device IDs by means of communication through the on-board communication network. The controller allows the engine to start only when the authentications of the device IDs are successful, that is, the electrical devices are legitimate.

The device individual authentication function can be applied to not only to the immobilizing control unit but also security devices (for example, a door lock controller) which do not have close relation with a starting operation of the engine. The device individual authentication function is applied to electrical devices (for example, a vehicle air conditioning system, a vehicle audio system or a vehicle navigation system) which have no relation with the starting operation of the engine, in order to prevent replacing a legitimate electrical device with a not-legitimate electrical device.

In the device individual authentication function, the engine is prohibited from starting when at least one of the authentications of the device IDs fails. In addition, each of the authentications of the device IDs fails not only when a legitimate device is replaced with another device but also when a trouble occurs in which the legitimate device cannot output its device ID because of, for example, malfunction. The engine is therefore prohibited from starting even when an electrical device which has no relation with the engine is malfunctioning. Such a problem puts a user of the vehicle in a serious situation in which the user cannot move the vehicle to a repair plant by himself/herself and is therefore obliged to have the vehicle towed. In addition, the user may not be able to turn on an air conditioning system of the vehicle. The conventional engine start controlling system does not take any measure against the problem.

SUMMARY OF THE INVENTION

It is therefore an object of the present invention to provide an engine start controlling system for a vehicle which performs a device individual authentication function and is capable of allowing an engine of the vehicle to start when one of authentications for IDs of electrical devices fails.

An engine start controlling system for an engine of the vehicle, for communicating with electrical devices each of which is installed to the vehicle and stores a device ID and with a mobile device which is carried by a user of the vehicle and stores a user ID, comprises a user ID authentication means, a device individual authentication means, and an engine start controller. The user ID authentication means is for making an authentication for the user ID received from the mobile device. The device individual authentication means is for making authentications for the respective device IDs received from the respective electrical devices. The engine start controller is (A) for allowing, based on a first engine starting operation made by means of a operation unit for starting the engine, the engine to start, in a case that the authentication for the user ID is successful and that all of the authentications for the respective device IDs are successful, and (B) for prohibiting the engine from starting, in a case that the authentication for the user ID is failed, irrespective of results of the authentications for the respective device IDs.

The engine start controller is further for allowing, based on a second engine starting operation which is made by means of the operation unit and is different from the first engine starting operation, the engine to start, in a case that all of authentications belonging to a first group are successful and that one or more of authentication belonging to a second group has failed, the first group consisting of authentications selected from the authentications for the device IDs, the second group consisting of authentications which are not selected as a member of the fist group.

It is therefore possible to allow an engine of the vehicle to start when one of authentications for IDs of electrical devices fails.

BRIEF DESCRIPTION OF THE DRAWINGS

The invention, together with additional objective, features and advantages thereof, will be best understood from the following description, the appended claims and the accompanying drawings. In the drawings:

DETAILED DESCRIPTION OF THE EMBODIMENTS

Figure 1:
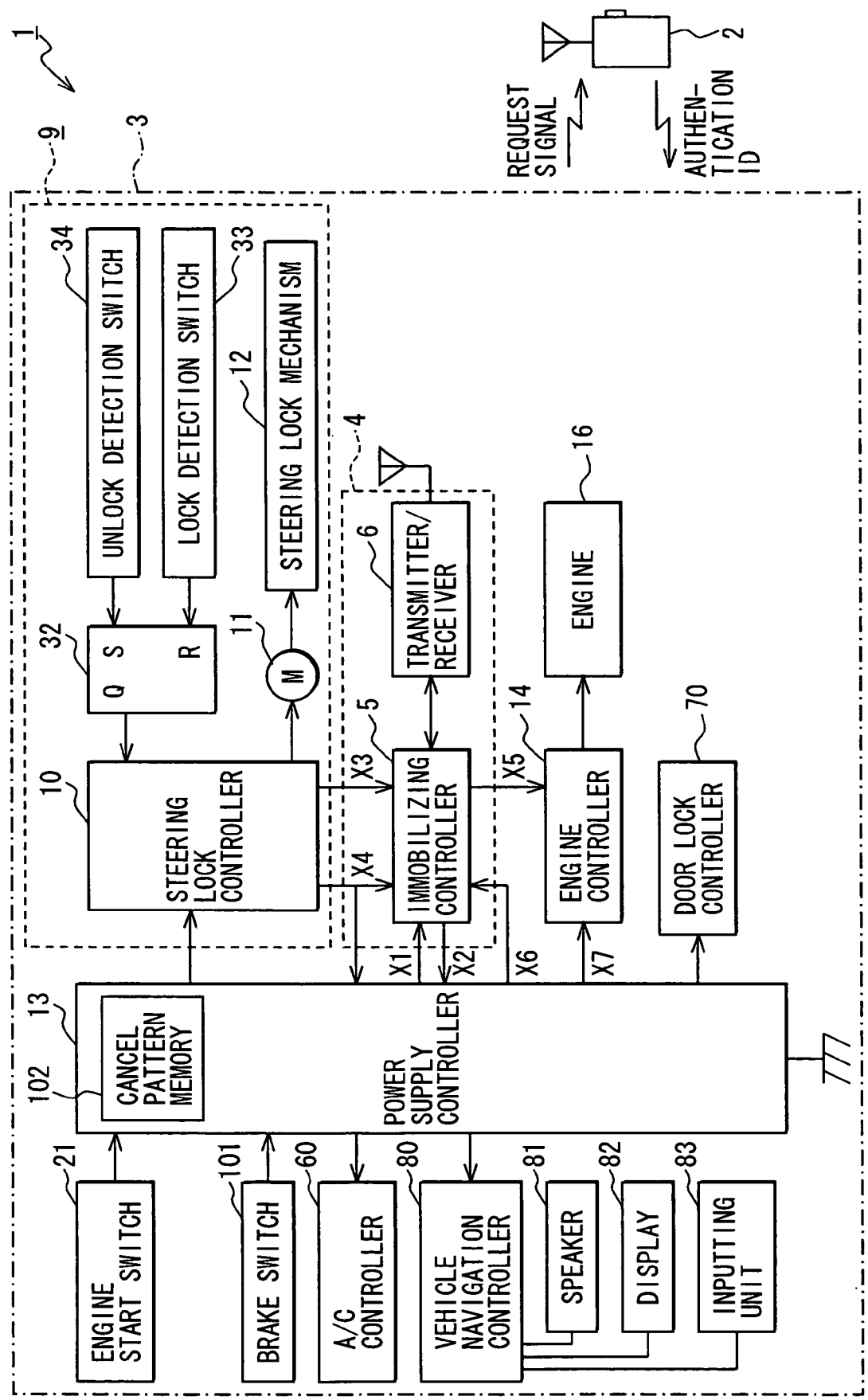
FIG. 1 is a block diagram showing an engine start control system providing an immobilizer function according to an embodiment of the present invention.

Hereafter, an embodiment of the present invention is described with reference to the figures. As shown in FIG. 1, an engine start control system 1 includes a wireless mobile communication device 2 and a controller 4. The mobile communication device 2 is freely carried by a user and may be called as a smart key or a security key. The controller 4 is installed in a vehicle 3 and includes an immobilizing controller 5 and a transmitter/receiver 6. The immobilizing controller 5 outputs a request signal to the transmitter/receiver 6 and the transmitter/receiver 6 accordingly transmits the output signal in an interior of the vehicle 3. The mobile communication device 2 automatically outputs a user ID to the vehicle 3 when the mobile communication device 2 receives the request signal in a predetermined region in the vehicle 3.

Figure 3:
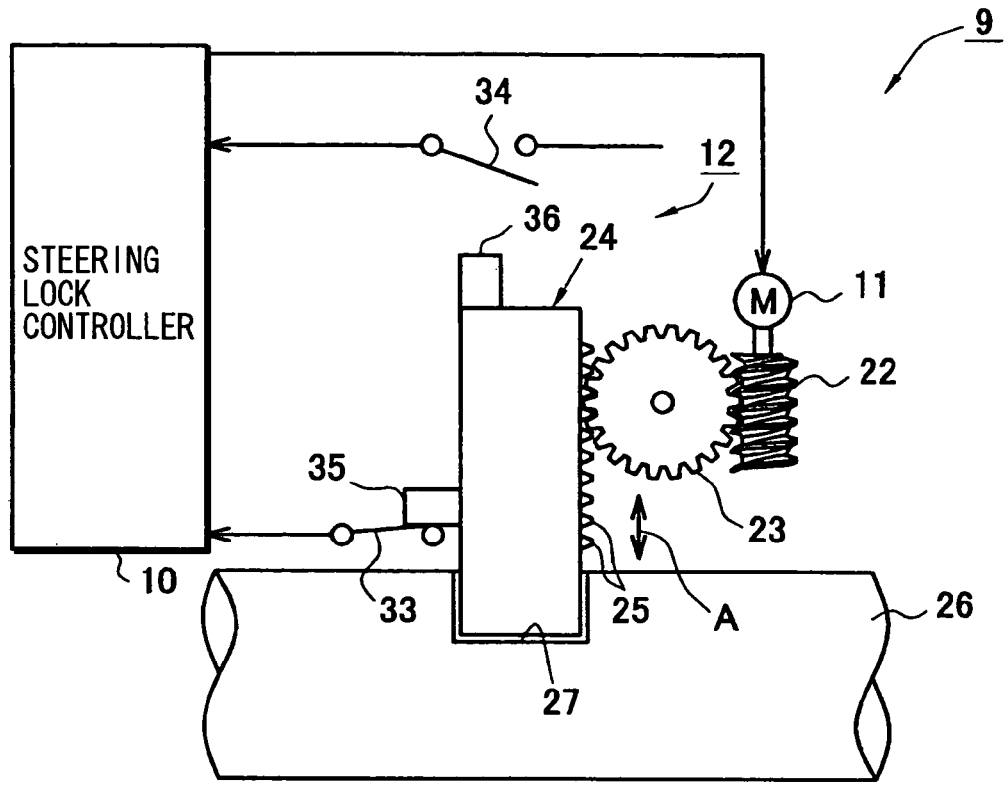
FIG. 3 is a schematic diagram showing an example of a steering lock system.

The engine start control system 1 also includes a power supply controller 13, an engine controller 14 and a steering lock system 9. The power supply controller 13 constitutes an engine start control unit together with the immobilizing controller 5. The engine controller 14 controls injections and ignitions of an engine 16 of the vehicle 3. The steering lock system 9 is for restricting rotation of a steering wheel in the case that the engine 16 stops. The steering lock system 9 includes a steering lock controller 10, a steering lock motor 11 serving as an actuator, and a steering lock mechanism 12. The steering lock mechanism 12 includes a warm gear 22, a spur gear 23 and a lock pin (also referred to as a lock bar) 24, which are shown in FIG. 3. As shown in FIG. 3, the warm gear 22 is attached to a rotation shaft of the steering lock motor 11 and engages with the spur gear 23. The spur gear 23 also engages with a gear portion 25 of the lock pin 24. The lock pin 24, which serves as a locking means, moves in a direction A in FIG. 3 in accordance with rotation of the rotation shaft of the steering lock motor 11. A tip of the lock pin 24 therefore is capable of getting into and out of a pit 27 formed on a surface of a steering shaft 26 of the steering wheel.

The steering lock mechanism 12 transits to a locked state in which rotation of the steering shaft 26 is restricted, when the rotation shaft of the steering lock motor 11 is rotated in a direction and the lock pin 24 gets into the pit 27. The steering lock mechanism 12 transits to an unlocked state in which the steering shaft 26 can be rotated, when the rotation shaft of the steering lock motor 11 is rotated in the opposite direction and the lock pin 24 gets out of the pit 27.

The steering lock system 9 also includes, as shown in FIG. 1 and FIG. 3, a lock detection switch 33 and an unlock detection switch 34. The switches 33 and 34 are mechanical switches (more specifically, limit switches). The lock detection switch 33 detects the locked state of the steering lock mechanism 12. More specifically, the lock detection switch 33 is turned on by being pressed by a contacting portion 35 fixed to a side of the lock pin 24 when the steering lock mechanism 12 transits to the locked state. The unlock detection switch 34 detects the unlocked state of the steering lock mechanism 12. More specifically, the unlock detection switch 34 is turned on by being pressed by a contacting portion 36 fixed to a top end of the lock pin 24 when the steering lock mechanism 12 transits to the unlocked state.

As shown in FIG. 1, a detection signal for the locked state and the unlocked state is inputted from the latching circuit 32 to the steering lock controller 10 as a level signal which is active in the unlocked state and is inactive in the unlocked state. More specifically, a signal from the unlock detection switch 34 is active (for example, high level) or inactive (for example, low level or earthed) when the switch 34 is ON or OFF, respectively. In addition, a signal from the lock detection switch 33 is active (for example, high level) or inactive (for example, low level or earthed) when the switch 33 is ON or OFF, respectively. An output signal of the unlock detection switch 34 is inputted to a set terminal of a latching circuit 32, an output signal of the lock detection switch 33 is inputted to a reset terminal of the latching circuit 32, and a Q output signal of the latching circuit 32 is inputted to the steering lock controller 10 as the detection signal. The detection signal therefore becomes inactive (locked) when an active signal is inputted to the reset terminal. Thus, the steering lock controller 10 does not detect the unlocked state until the lock pin 24 totally gets out of the pit 27 and then the contacting portion 36 pushes the unlock detection switch 34.

The engine start control system 1 also includes an operation switch (hereafter referred to as an engine start switch) 21 and a brake switch 101, which are electrically connected with the power supply controller 13. The engine start switch 21 is for a single push type engine start system in which the engine 16 starts and stops in accordance with a user's operation to the engine start switch 21. The engine start switch 21 is located in a place (for example, a place at a side of a cockpit panel in the vehicle 3) which a driver of the vehicle 3 can reach with his/her hand. The engine 16 is allowed to start when the driver pushes the engine start switch 21 while pedaling the brake pedal of the vehicle 3. Pedaling of the brake pedal is detected by the brake switch 101.

The immobilizing controller 5 receives through the transmitter/receiver 6 the user ID which has been transmitted by the mobile communication device 2 and compares the received user ID with a master user ID stored in a verification memory (not shown in FIG. 1) in the immobilizing controller 5. The immobilizing controller 5 controls a door lock controller 70 to drive door lock/unlock motors and unlock the doors of the vehicle 3, when the two IDs are identical. The immobilizing controller 5 controls the door lock controller 70 to drive the door lock/unlock motors and lock the doors, when it becomes impossible to receive the user ID from the mobile communication device 2. The doors are therefore unlocked when the user comes close to the vehicle 3 with the mobile communication device 2. In addition, the doors are locked when the user get away from the vehicle 3 with the mobile communication device 2.

The engine start control system 1 also includes an air conditioning controller 60 for controlling condition of air in the vehicle 3 and a vehicle navigation controller 80 for controlling operation of a vehicle navigation system.

Each of the immobilizing controller 5, the steering lock controller 10, the power supply controller 13 and the engine controller 14 is an electrical device of the first kind which has a function contributing to a control for starting the engine 16. In contrast, each of the air conditioning controller 60, the door lock controller 70 and the vehicle navigation controller 80 are an electrical device of the second kind which does not have a function contributing to the control for starting the engine 16. In another aspect, the electrical devices of the first kind have a function contributing to a movement of the vehicle, and the electrical device of the second kind do not have a function contributing to a movement of the vehicle. Each of the controllers 5, 10, 13, 14, 60, 70 and 80 includes a device individual ID memory both for storing a device ID of the controller and for authentication of the device ID against unauthorized replacement of the controller. Each device ID is allocated in an EEPROM (which servers as a nonvolatile memory) of each of the controllers 5, 10, 13, 14, 60, 70 and 80. In addition, an EEPROM of the immobilizing controller 5 stores master device IDs for the respective controllers 5, 10, 13, 14, 60, 70 and 80 and includes a device individual ID verification work memory which is used in comparing the respective master device IDs with the respective device IDs from the controllers 5, 10, 13, 14, 60, 70 and 80. Each of the device IDs includes a code for indicating whether the corresponding controller is the electrical device of the first kind or the electrical device of the second kind. Therefore, the immobilizing controller 5 can easily determine whether each of the controllers 5, 10, 13, 14, 60, 70 and 80 is of the first kind or of the second kind.

Figure 5:
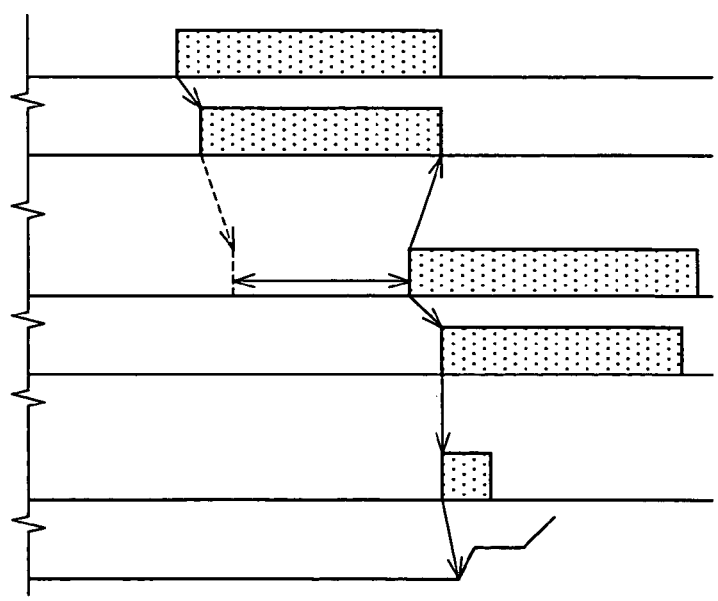
FIG. 5 is a timing chart of the process shown in FIG. 4.
Figure 4:
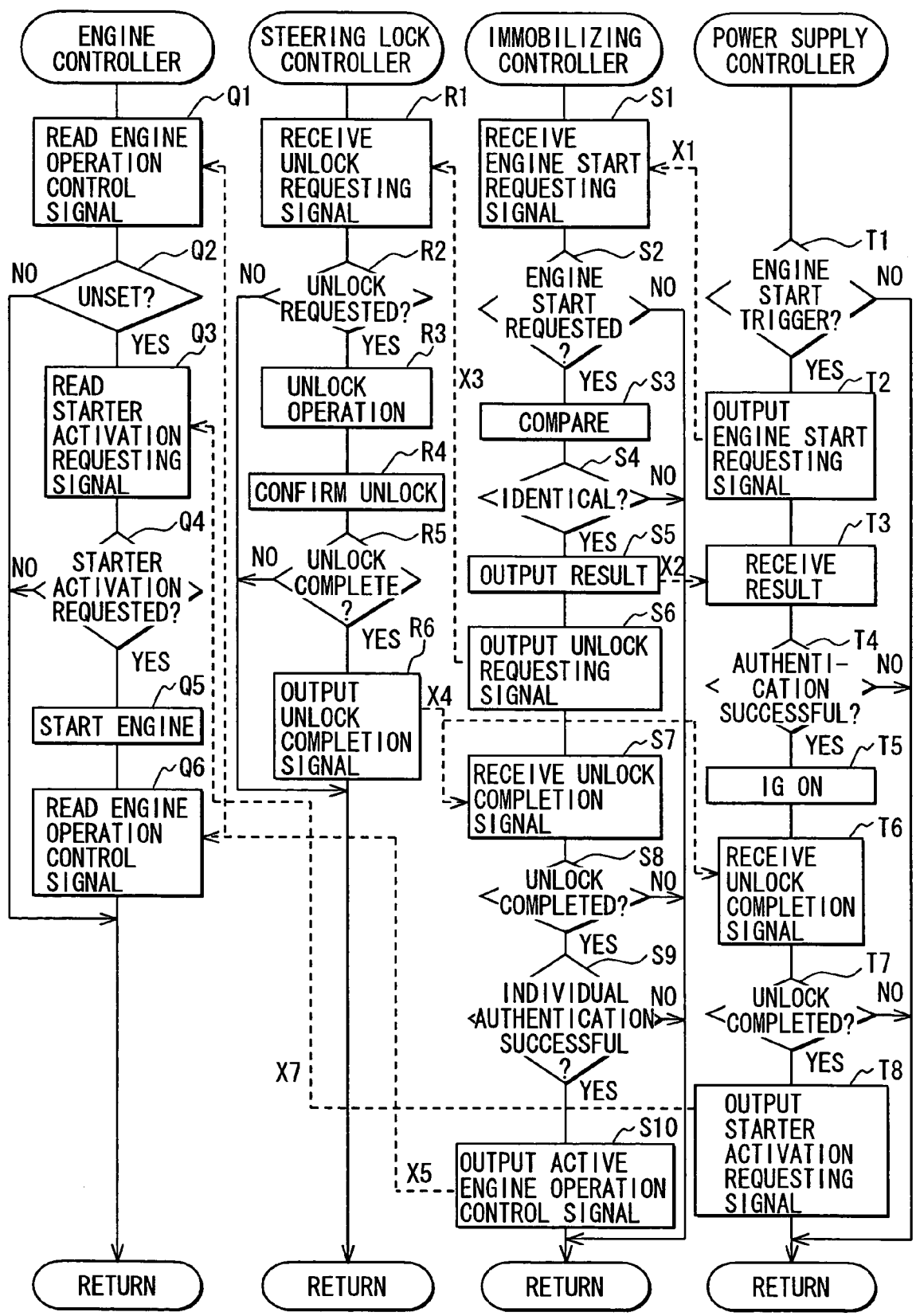
FIG. 4 is a flowchart showing a process executed by the engine start control system.

Hereafter, an operation of the engine start control system 1 is described with reference to a flowchart in FIG. 4 and a timing chart in FIG. 5. As shown in FIG. 4, the power supply controller 13 determines at step T1 whether an engine start trigger is detected. The engine start trigger is generated based on an engine start operation in a normal mode. In the engine start operation, the engine start switch 21 is pressed once for a threshold time (for example, 0.5 seconds) while the brake switch 101 is continuously pressed. On detecting the engine start trigger, the power supply controller 13 outputs at step T2 an engine start requesting signal X1 to the immobilizing controller 5. Then the immobilizing controller 5 receives at step S1 the engine start requesting signal X1 and accordingly determines at step S2 that starting of the engine 16 is requested. Subsequently, the immobilizing controller 5 compares at step S3 the user ID from the mobile communication device 2 with the master user ID set for the vehicle 3 and makes a determination at step S4 whether the user ID and the master user ID is identical. The immobilizing controller 5 then outputs at step S5 a signal X2 indicating a result of the comparison to the power supply controller 13, when the determination at step S4 is affirmative, that is, when a user ID authentication is successful. A function for the user ID authentication is thus provided. Subsequently, the immobilizing controller 5 outputs at step S6 an unlock requesting signal X3 to the steering lock controller 10. The steering lock controller 10 then receives at step R1 the unlock requesting signal X3 and accordingly determines at step R2 that unlocking of the steering wheel is requested. Subsequently, the steering lock controller 10 unlocks at step R3 the steering lock mechanism 12 by operating the steering lock motor 11. When the power supply controller 13 detects at steps R4 and R5 that the steering lock mechanism 12 is completely unlocked, it outputs at step R6 an unlock completion signal X4 to the immobilizing controller 5 and the power supply controller 13.

Figure 2:
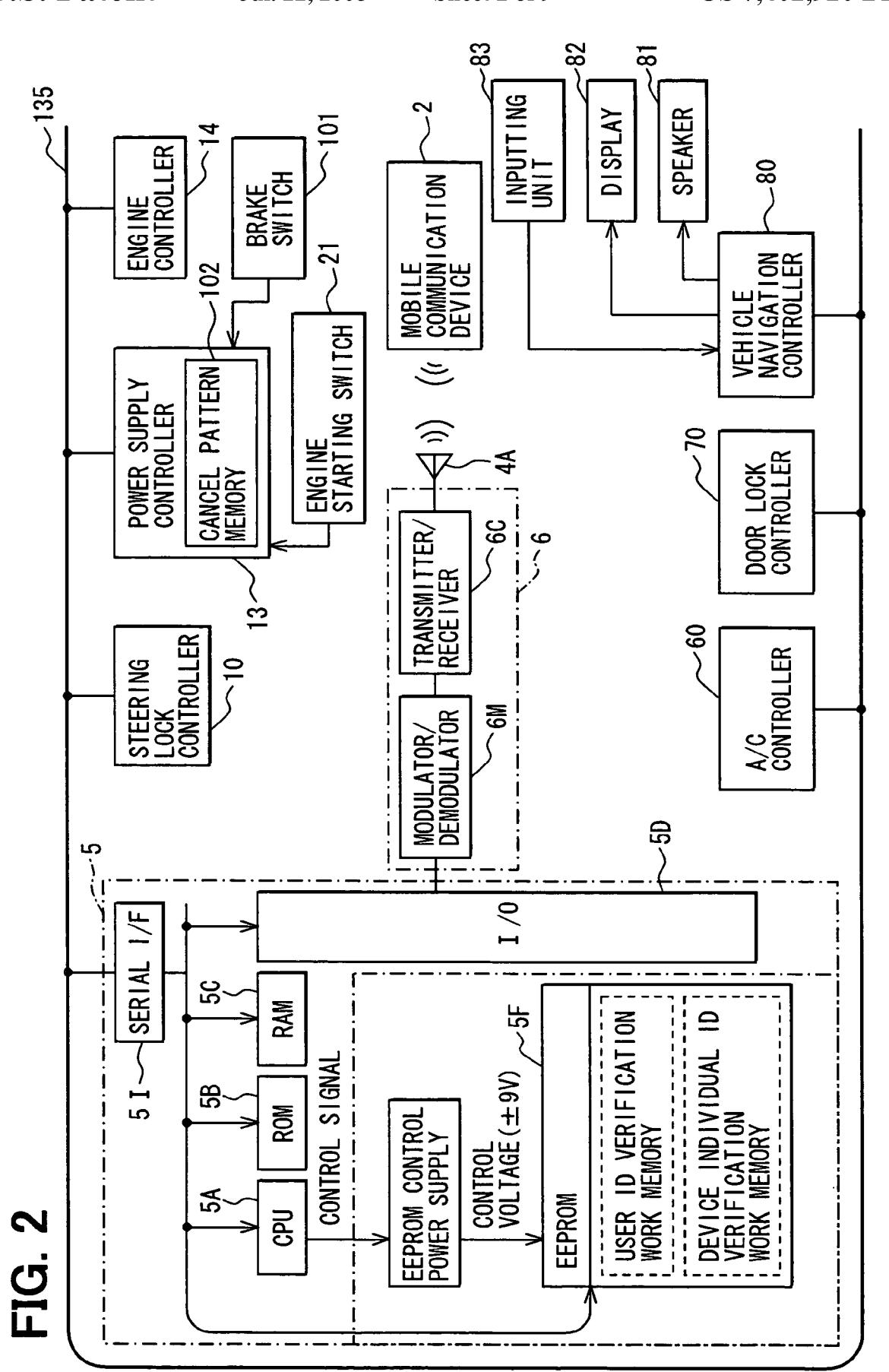
FIG. 2 is a block diagram showing an engine start control system according to another embodiment of the present invention.

When the power supply controller 13 receives at step T3 the signal X2 indicating the result of the comparison and determines at step T4 that the user authentication is successful, it turns at step T5 an ignition state (IG) of the vehicle 3 to ON (X6 in FIG. 2).

When the immobilizing controller 5 correctly receives at step S7 and S8 the unlock completion signal X4 from the steering lock controller 10, it determines at step S9 whether an individual authentication (which is described later in detail) for the controllers 5, 10, 13, 14, 60, 70 and 80 is successful. When the determination at step S9 is affirmative, the immobilizing controller 5 subsequently transits at step S10 to an immobilizing unset state in which the immobilizing controller 5 outputs to the engine controller 14 an active engine operation control signal X5 in order to allow the engine 16 to start. If the determination at step S9 is negative, the immobilizing controller 5 subsequently transits at step S10 to an immobilizing set state in which the immobilizing controller 5 outputs to the engine controller 14 an inactive engine operation control signal X5 in order to prohibit the engine 16 from starting. The power supply controller 13 also receives at steps T6 and T7 the unlock completion signal X4 and accordingly outputs at step T8 a starter activation requesting signal X7 (which is active) to the engine controller 14.

In an initial state, the engine controller 14 keeps watching at step Q1 for the engine operation control signal X5 and determining at step Q2 whether the engine operation control signal X5 becomes active, that is, whether the immobilizing controller 5 transits to the immobilizing unset state. When the immobilizing controller 5 transits to the immobilizing unset state, the engine controller 14 reads at step Q3 the starter activation requesting signal X7 from the power supply controller 13 and determines at step Q4 whether the starter activation requesting signal X7 is active. The engine controller 14 starts the engine 16 at step Q5, when the determination at step Q4 is affirmative. The engine controller 14 subsequently reads at step Q6 the engine operation control signal X5 again for confirmation.

When the determination at step S9 is negative, that is, when the individual authentication for the controllers 5, 10, 13, 14, 60, 70 and 80 has failed, the immobilizing controller 5 skips step S10 and therefore does not transit to the immobilizing unset state. In this case, the engine controller 14 cannot receive the active engine operation control signal X5 and therefore skips step Q3 and the following steps Q4 to Q6. Thus, the engine 16 is prohibited from starting by the immobilizing controller 5 which serves as a device individual authentication means.

Figure 13:
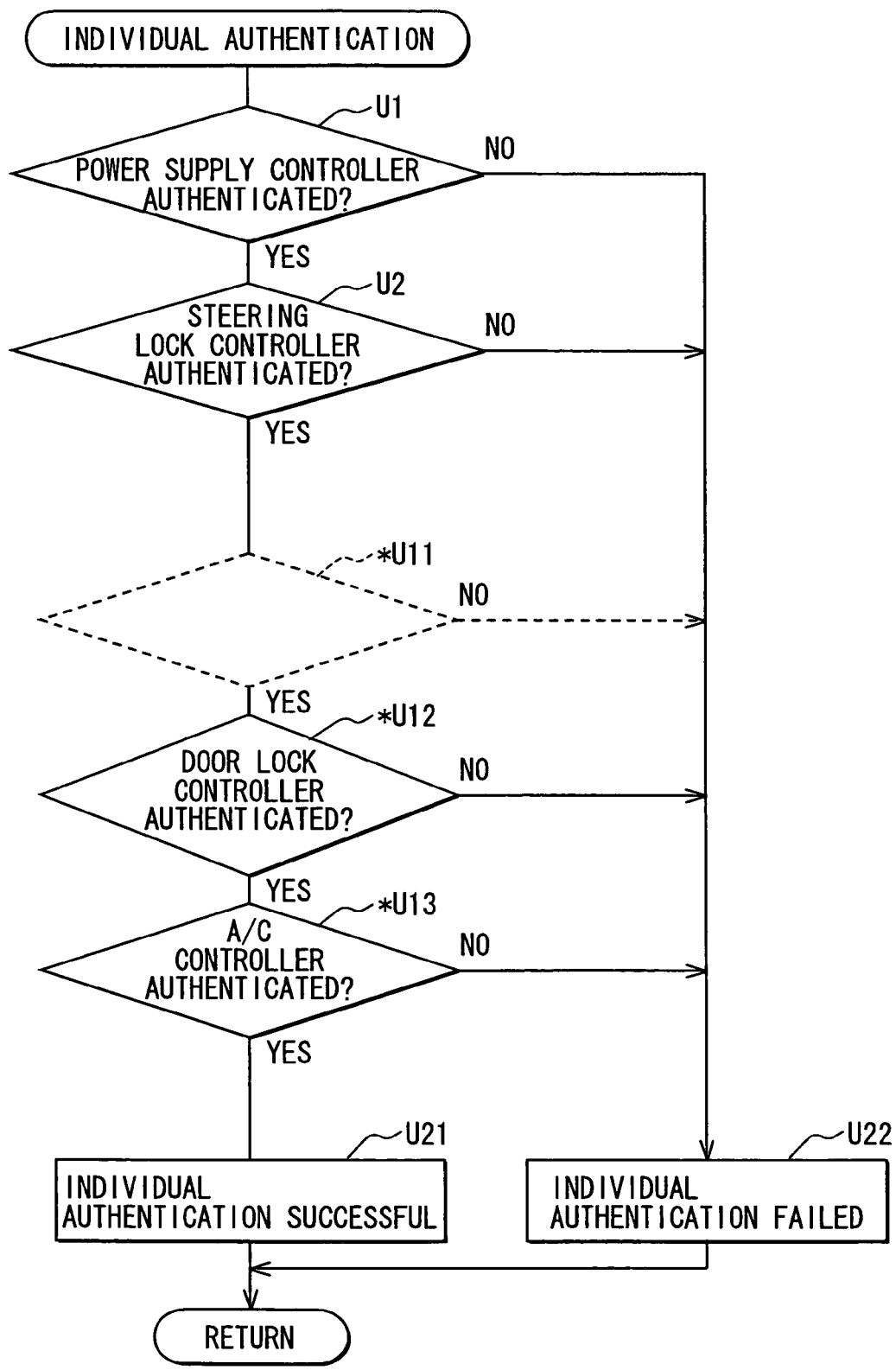
FIG. 13 is a flowchart showing an individual authentication for the controllers in a related art.

In a conventional individual authentication shown in FIG. 13, authentications for respective controllers are made at steps U1, U2, *U11, *U12 and *U13, at each of which device ID of a controller is compared with a master device ID by using the device individual ID verification work memory in the immobilizing controller 5, which executes the individual authentication. In steps U1 and U2, the controllers which serve as the electrical devices of the first kind are authenticated. In steps *U11, *U12 and *U13, the controllers which serves as the electrical devices of the second kind are authenticated. When all of the authentications at steps U1, U2, *U11, *U12 and *U13 are successful, that is, when pairs of a master device ID and a corresponding device ID are determined to be identical in all steps U1, U2, *U11, *U12 and *U13, the conventional individual authentication is determined at step U21 to be successful. When at least one of the authentications at steps U1, U2, *U11, *U12 and *U13 fails, that is, when at least a pair of a master device ID and a corresponding device ID is determined not to be identical in at least one of steps U1, U2, *U11, *U12 and *U13, the conventional individual authentication is determined at step U22 to be failed.

Figure 12:
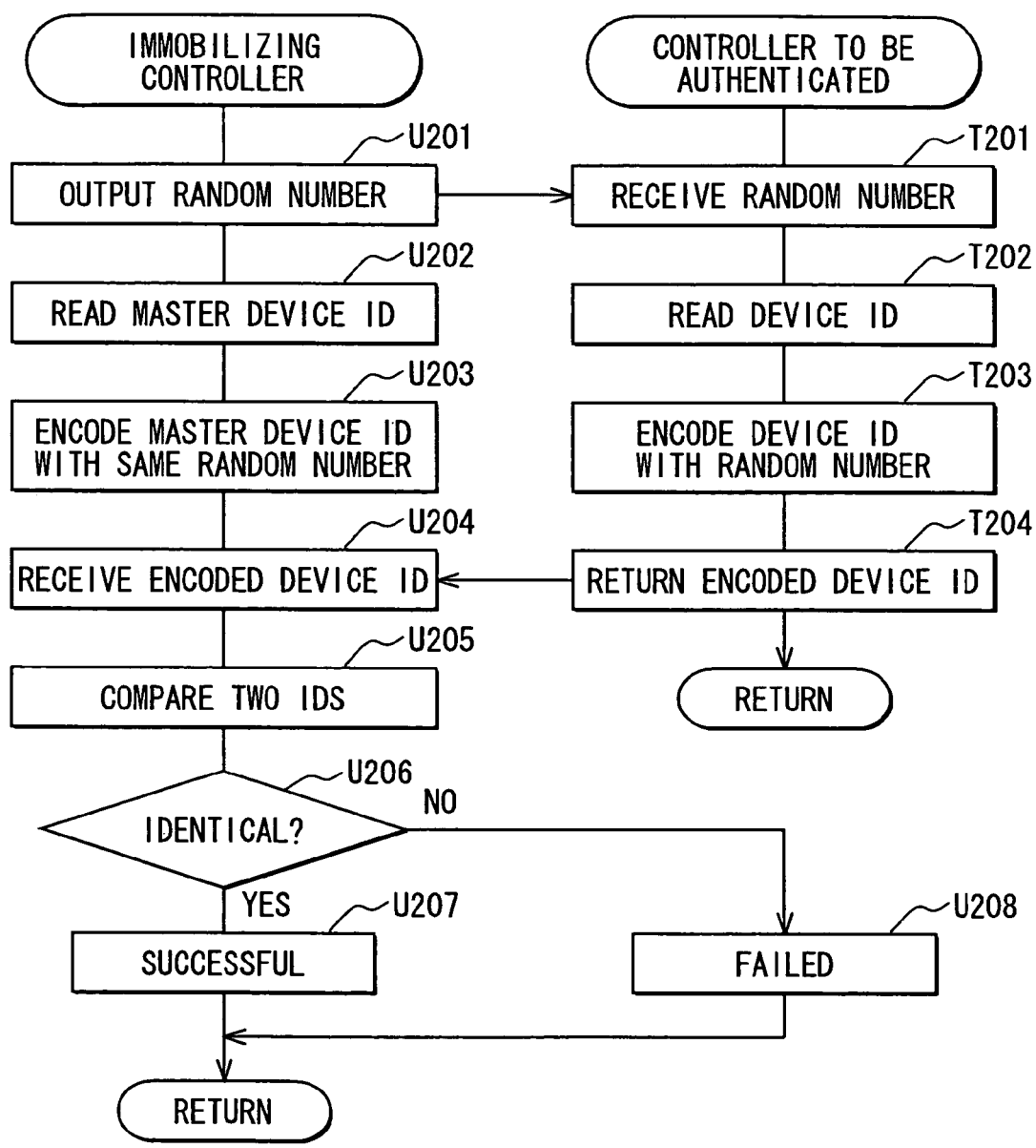
FIG. 12 is a flowchart showing a comparison process for a device ID and a master ID.

In an authentication for a controller, the immobilizing controller 5 and a controller (hereafter referred to as a target controller) to be authenticated executes processes shown in FIG. 12 in order to prohibit unauthorized replacement of the target controller. As shown in FIG. 12, the immobilizing controller 5 outputs at step U201 a random number to the target controller. The target controller then receives at step T201, reads at step T202 its device ID, encodes at T203 the device ID with a predetermined algorithm by using the received random number, and returns at step T204 to the immobilizing controller 5 the encoded device ID. The immobilizing controller 5 reads at step U202 a master device ID corresponding to the target controller, encodes at step U203 the master device ID with the same algorithm by using the outputted random number. The immobilizing controller 5 subsequently receives at step U204 the encoded device ID from the target controller, compares at step U205 the encoded master device ID and the encoded device ID, and determines at step U206 whether the two encoded IDs are identical. The immobilizing controller 5 determines at step U207 that the authentication for the target controller is successful when the determination at step U206 is affirmative. The immobilizing controller 5 determines at step U208 that the authentication for the target controller has failed when the determination at step U206 is negative.

The conventional individual authentication in FIG. 13 fails when at least one of the electrical devices of the second kind fails to be authenticated, although the electrical devices of the second kind do not have close relation with the control for starting the engine 16 (or, in another aspect, with the control for the movement of the vehicle 3).

Figure 6:
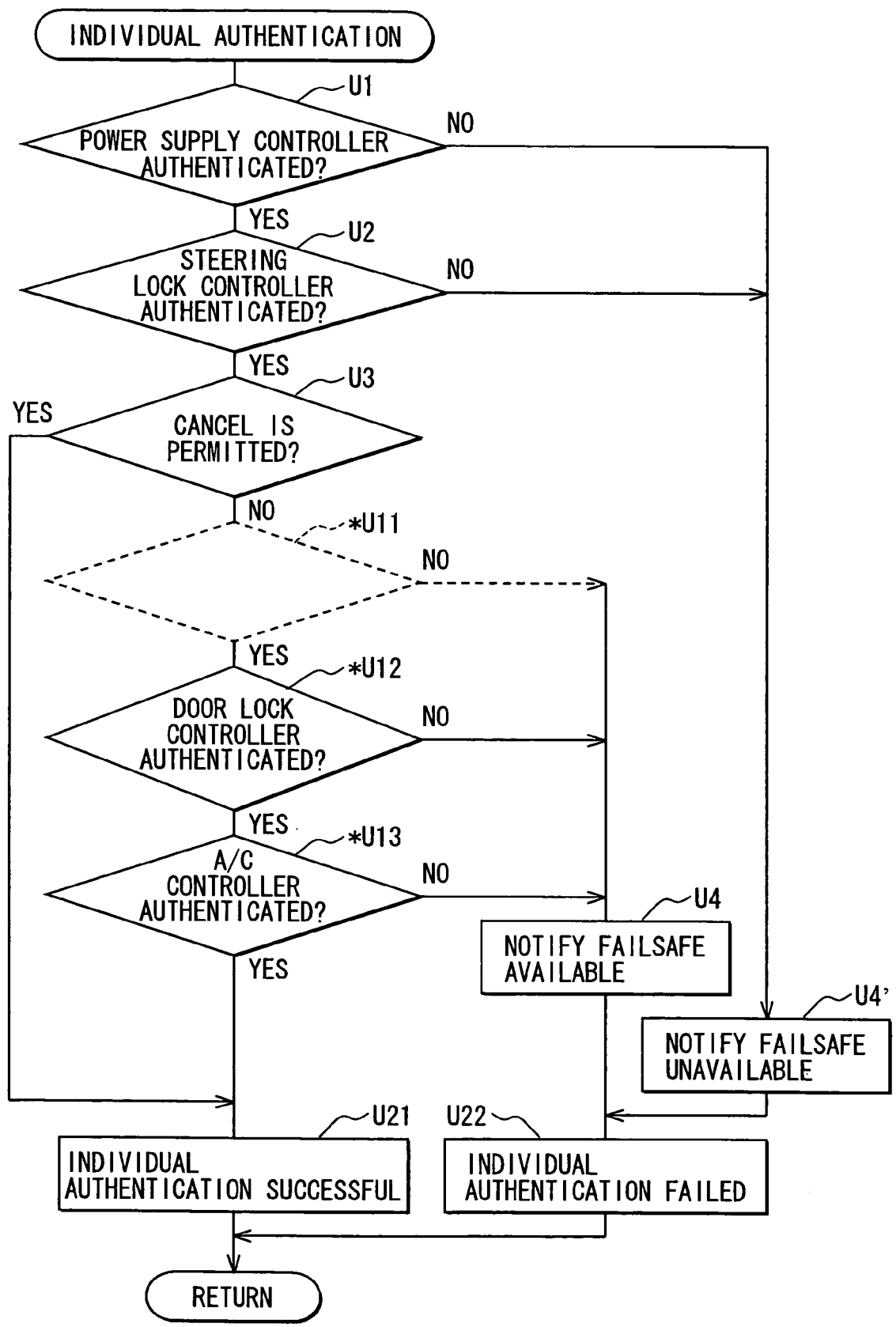
FIG. 6 is a flowchart showing an individual authentication according to an embodiment of the present invention in which a failsafe function is incorporated.

In contrast, in the individual authentication of the present embodiment shown in FIG. 6, the authentications U1 and U2 for the electrical devices of the first kind are executed before the authentications *U11, *U12 and *U13 for the electrical devices of the second kind. In addition, a determination step U3 for providing a function for starting the engine 16 in a failsafe mode is executed after the authentications for the electrical devices of the first kind and before the authentications for the electrical devices of the second kind.

More specifically, in the individual authentication shown in FIG. 6, the immobilizing controller 5 executes step U4 when one of authentications at steps *U11 to *U13 for the electrical devices of the second kind fails. At step U4, the immobilizing controller 5 may control vehicle navigation controller 80 so that one of a speaker 81 or a display 82, which are connected with the vehicle navigation controller 80, provides information telling that it is possible to start the engine 16 in the failsafe mode. For example, the immobilizing controller 5 may cause the speaker 81 or the display 82 to inform the user, by voice or image, that "There is a security problem. You can start the engine in the failsafe mode." The operation of the immobilizing controller 5 at step U4 serves as a failsafe notification means. When one of the authentications fails, the immobilizing controller 5 may store the result of the failed authentication in a predetermined diagnosis storage unit (which may be allocated in the EEPROM of the immobilizing controller 5) and outputs the stored result to an external device (for example, a display, a printer, or an external storage device).

The immobilizing controller 5 executes step U4' when one of authentications at steps U1 and U2 for the electrical devices of the second kind fails. At step U4', the immobilizing controller 5 may control vehicle navigation controller 80 so that one of the speaker 81 or the display 82 provides information telling that it is impossible to start the engine 16 in the failsafe mode. For example, the immobilizing controller 5 may cause the speaker 81 or the display 82 to inform the user, by voice or image, that "There is a security problem. You are not allowed to start the engine in the failsafe mode."

Figure 7:
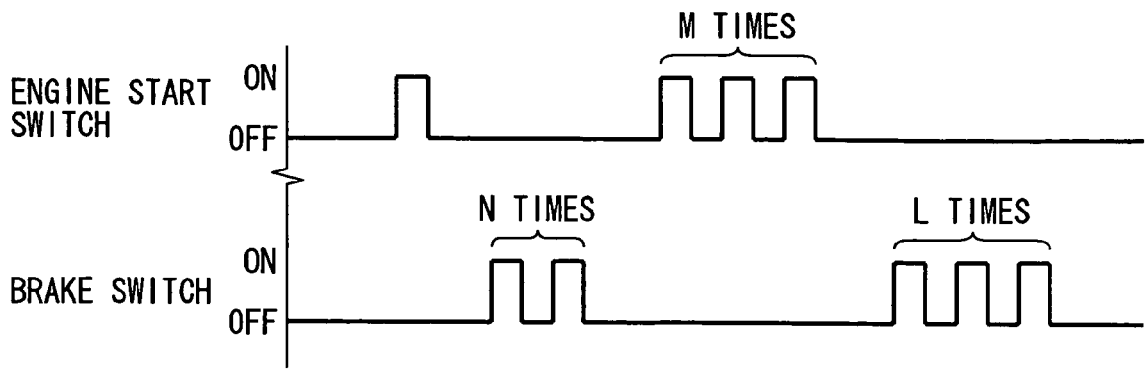
FIG. 7 is a timing chart showing the first example of pattern for failsafe starting operations.
Figure 8:
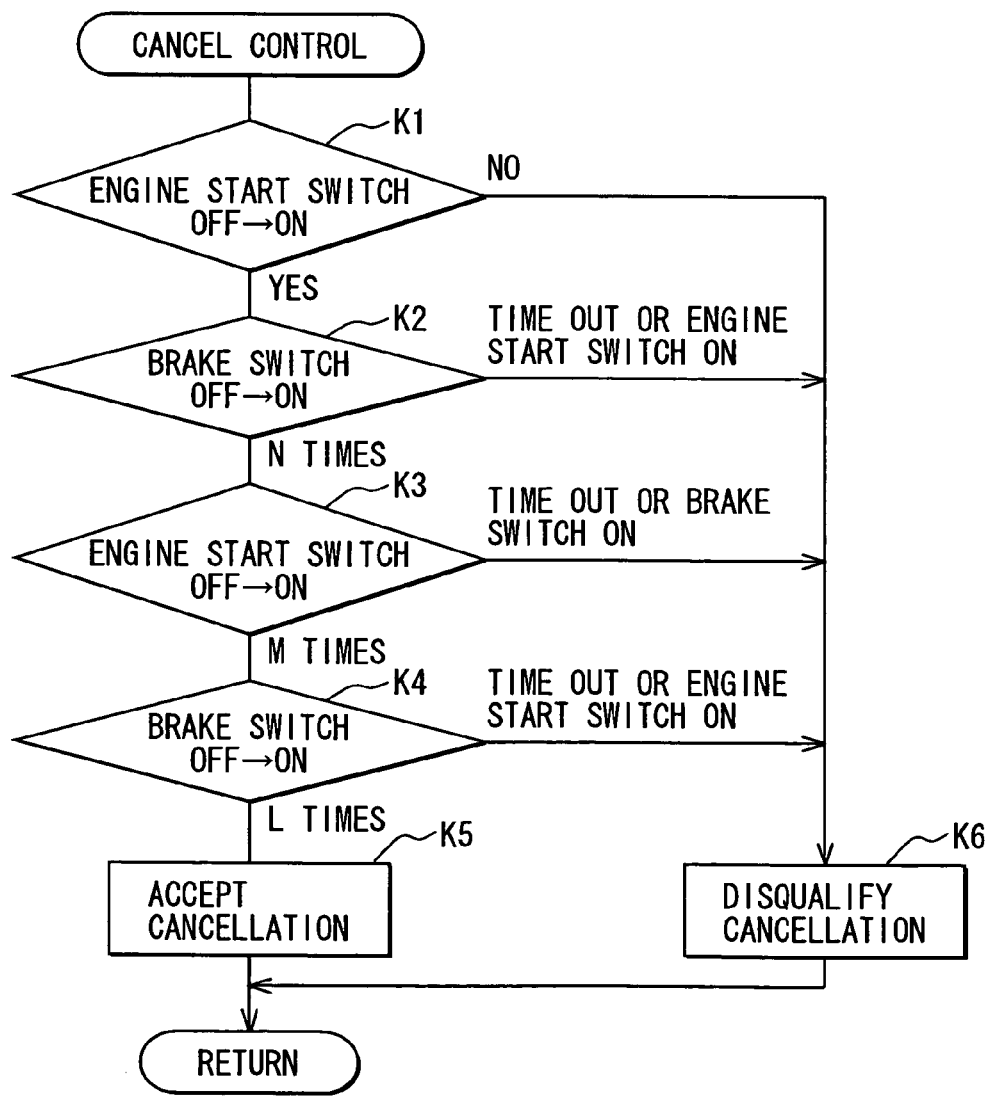
FIG. 8 is a flowchart showing a process for verifying the pattern shown in FIG. 7.

When the user is notified of the information telling that the user can start the engine 16 in the failsafe mode, the user can start the engine 16 by performing a predetermined failsafe starting operation (which is also referred to as a cancel pattern). The failsafe starting operation is different from an operation (hereafter referred to as a normal starting operation) to stat the engine 16 in the normal mode. For example, as shown in FIG. 7 and FIG. 8, the immobilizing controller 5 may accept at step K5 a combination of operations of the engine start switch 21 and the brake switch 101 as the failsafe starting operation, when in the combination the engine start switch 21 is turned on once (step K1), the brake switch 101 is subsequently turned on for N times in a limited period without interruption by the engine start switch 21 (step K2), the engine start switch 21 is subsequently turned on for M times in a limited period without interruption by the brake switch 101 (step K3), and the brake switch 101 is subsequently turned on for L times in a limited period without interruption from the engine start switch 21 (step K4), where the predetermined numbers M, N and L are integers. In this failsafe starting operation, a period for operations of the engine start switch 21 and a period for operations of the brake switch 101 comes alternately. If the number of pressing of the engine start switch 21 or the brake switch 101 is different from the predetermined number M, N or L in each of the periods for operations of the engine start switch 21 or the brake switch 101, the immobilizing controller 5 disqualifies at step K6 the combination of operations as the failsafe starting operation. In the failsafe starting operation, the engine start switch 21 and the brake switch 101 may be simultaneously operated in independent complicated manners, although the user may have to be trained to get accustomed to the failsafe starting operation.

As shown in FIG. 6, the immobilizing controller 5 nullifies at step U3 the results of the authentications previously executed in at least one of steps *U11, *U12 and *U13. The operation of the immobilizing controller 5 at step U3 serves as an authentication nullifying means. In this case, the immobilizing controller 5 determines at step U21 that the individual authentication is successful when all of the authentications for the electrical devices of the first kind are successful, in spite of the failed result of the authentication previously executed in one of steps *U11, *U12 and *U13. As a result, the immobilizing controller 5 makes an affirmative determination at step S9 in FIG. 4 and outputs at step S10 the active engine operation control signal X5 to start the engine 16.

As described above, the engine 16 can be started by making the failsafe starting operation different from the normal starting operation even when an authentication for a device ID of a predetermined electrical device has failed because of a cause (for example, malfunctioning) other than an unauthorized operation. Therefore, the user can move the vehicle 3 to a vehicle shop or a repair plant by himself/herself and activate the air conditioning system without a problem.

In addition, the engine start control system 1 executes authentications for all the electrical devices of the first kind and second kind, and nullifies failed one (or more) of the authentications based on the failsafe starting operation. Therefore, the user can intentionally avoid discard some of authentications which is not unnecessary for starting the engine 16. In addition, algorithm for the authentications can be significantly simplified.

In addition, the electrical devices of the first kind includes the steering lock controller 10, the power supply controller 13. The devices are main components of the engine start control system 1 and are controllers which directly prevent the vehicle 3 traveling in accordance with the driver's intention. It is likely that an unauthorized replacement of the devices is attempted in order to steal the vehicle while the owner of the vehicle 3 is absent when the authentication of these devices are failed. It is therefore possible to improve security of the engine start control system 1 by excluding the electrical devices of the first kind from a target for the failsafe starting operation.

The electrical devices of the second kind include the air conditioning controller 60, the door lock controller 70 and the vehicle navigation controller 80. Replacement of these devices does not contribute to compromising the immobilizing controller 5. Risk of theft of the devices is not as high as that of the devices of the first kind. It is therefore likely a device of the first kind is malfunctioning when the authentication for the device is failed and accordingly the engine 16 is prohibited from starting. It is therefore preferable to set the devices of the second kind as targets for the failsafe starting operation.

Figure 9:
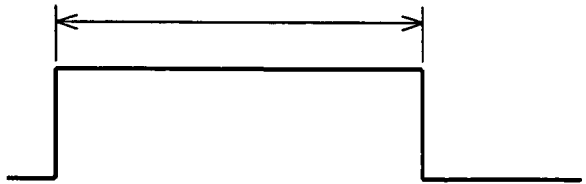
FIG. 9 is a timing chart showing the second example of the pattern for the failsafe starting operations.
Figure 10:
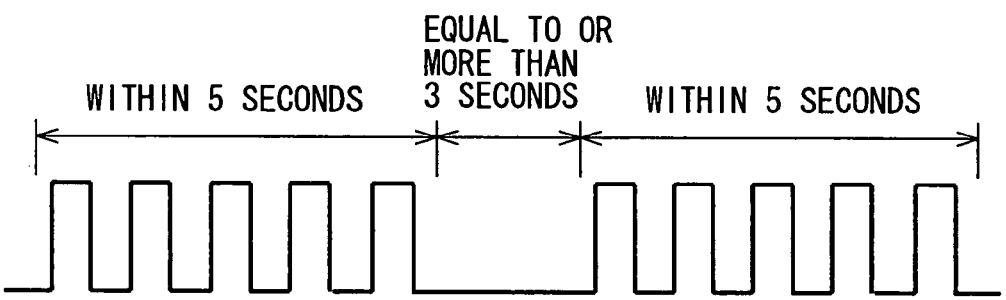
FIG. 10 is a timing chart showing the third example of the pattern for the failsafe starting operations.

The immobilizing controller 5 may accept series of operations as the failsafe starting operation when in the series the engine start switch 21 is operated in a way different from the normal starting operation while the brake switch 101 is kept pressed in the same way as the normal starting operation. For example, the immobilizing controller 5 may accept series of operations as the failsafe starting operation when in the series the engine start switch 21 is pressed, as shown in FIG. 9, once for a period (for example, 5 seconds) which is longer than the threshold period for the normal starting operation while the brake switch 101 is kept pressed in the same way as the normal starting operation. Otherwise, the immobilizing controller 5 may accept series of operations as the failsafe starting operation when in the series the engine start switch 21 is pressed, as shown in FIG. 10, intermittently in a complicated manner while the brake switch 101 is kept pressed in the same way as the normal starting operation. Otherwise, the immobilizing controller 5 may accept series of operations as the failsafe starting operation when in the series the brake switch 101 is pressed intermittently in a complicated manner while the engine start switch 21 is kept pressed.

Figure 11:
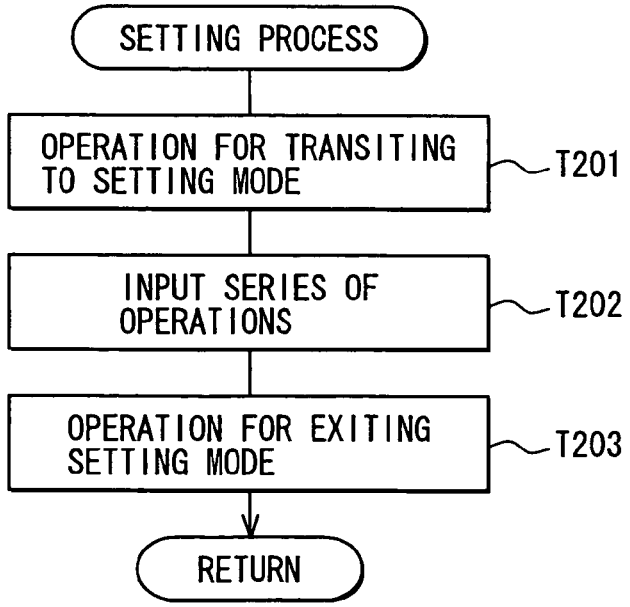
FIG. 11 is a flowchart showing a process for a setting mode of the failsafe starting operations.

The failsafe starting operations may be set according to preferences of the users. In this case, the immobilizing controller 5 may transit to a setting mode when the engine start switch 21 is operated in a predetermined manner for transiting to the setting mode. In this case, as shown in FIG. 11, the user pushes at step T201 the engine start switch 21 for a predetermined period as an operation for transiting to the setting mode. The immobilizing controller 5 then transits to the setting mode and may notify accordingly by an alarm sound. Subsequently at step T202, the user inputs, as the failsafe starting operations to be set, preferred series of operations to the engine start switch 21 and brake switch 101. Thus the engine start switch 21 and the brake switch 101 serve, as a whole, an engine starting operation unit and engine starting pattern input means. When the user finishes inputting the series of the operations, the user pushes at step T203 the engine start switch 21 for a predetermined period as an operation for exiting the setting mode. Thus, the immobilizing controller 5 finishes setting the new failsafe starting operations. The immobilizing controller 5 may authenticate the user before setting the new failsafe starting operation, in order to prevent a person other than the owner of the vehicle 3 from inputting series of operations as the new failsafe starting operations. In this case, the immobilizing controller 5 allows the user to input series of operations as the new failsafe starting operations only when the authentication is successful. The authentication may be executed by using a password (or a pass pattern) which is inputted by the user through, for example, the engine start switch 21. The immobilizing controller 5 may accept series of operations as the new failsafe starting operations when the series of the operations are inputted through a connector provided in the vehicle 3 only for the setting mode. In this case, a person in an automobile shop may input the series of the operations by using an inputting unit which is connected with the connector.

In the setting mode, the immobilizing controller 5 may receive information regarding characteristics of the failsafe starting operation such as numbers N, M and L and modify the failsafe starting operation accordingly. In this case, the user may input the information regarding the characteristics of the failsafe starting operation through an inputting unit such as an inputting unit 83 which includes a touch panel and is connected with the vehicle navigation controller 80. In this case, the inputting unit 83 serves as a failsafe starting operation pattern inputting means.

The inputted failsafe starting operations (or its characteristics) may be stored in a cancel pattern memory 102 which is included in the power supply controller 13 and serves as a failsafe starting operation pattern setting means.

The present invention should not be limited to the embodiment discussed above and shown in the figures, but may be implemented in various ways without departing from the spirit of the invention.

For example, each of the immobilizing controller 5, the steering lock controller 10, the power supply controller 13 and the engine controller 14 may be an ECU having a well-known microcomputer having a CPU, a ROM, a RAM and an outputting unit (that is, an I/O port) which are connected through bus lines. Each of the ROMs stores programs for providing functions for an ECU in which the ROM is incorporated. In this case, the immobilizing controller 5, the steering lock controller 10, the power supply controller 13, the engine controller 14, the air conditioning controller 60, the door lock controller 70 and the vehicle navigation controller 80 may be, as shown in FIG. 2, connected with each other through a network made by a communication bus 35. The immobilizing controller 5 may include, as shown in FIG. 2, a CPU 5A, a ROM 5B, a RAM 5C and an I/O 5D. In addition, the immobilizing controller 5 may include an EEPROM 5F which serves as a nonvolatile memory storing the master user ID and including a user ID verification work memory used for comparing the user ID with the master user ID.

What is claimed is:

1. An engine start controlling system for an engine of the vehicle, comprising:

a user ID authentication means for making an authentication for a user ID received from a mobile device which is carried by a user of the vehicle and stores the user ID;

a device authentication means for respectively making an individual authentication for device IDs received from the electrical devices each of which is installed to the vehicle and stores the device ID; and an engine start controller allowing the engine to start based on a first starting operation made by means of an operation unit for starting the engine, in a case that the authentication for the user ID is successful and that all of the authentications for the respective device IDs are successful, the engine start controller prohibiting the engine from starting, in a case that the authentication for the user ID is unsuccessful, irrespective of results of the authentications for the respective device IDs, wherein the engine start controller is further for allowing the engine to start based on a second starting operation made by means of the operation unit, in a case that all of authentications are successful with respect to a first group of the electrical devices and that the authentications are unsuccessful with respect to a second group of the electrical devices.

2. The engine start controlling system according to claim 1, wherein the device individual authentication means includes an authentication nullifying means for nullifying one or more unsuccessful authentications for the device IDs based on the second starting operation.

3. The engine start controlling system according to claim 1, wherein the first group of the electrical devices have a function contributing to an engine start control, the second group of the electrical devices have no function contributing to the engine start control, and the engine start controller allows the engine to start based on the second starting operation in a case that the authentication for the device IDs with respect to the second group of the electrical devises are unsuccessful.

4. The engine start controlling system according to claim 3, wherein:

the first group of the electrical devices includes:

a steering lock controller which controls a steering lock mechanism for switching a steering of the vehicle between a locked state and an unlocked state, so that the steering lock mechanism switches the steering into the unlocked state based on that the authentication for the user ID is successful; and a power supply controller for controlling power supply to the engine start controller and the steering lock controller; and the second group of the electrical devices includes at least one of:

a door lock controller for controlling a door lock mechanism of the vehicle;

a vehicle navigation controller for controlling a vehicle navigation system; and an air conditioning controller for controlling an air-conditioner for the vehicle.

5. The engine start controlling system according to claim 3, wherein the device individual authentication means includes an authentication nullifying means for nullifying the authentications for the device IDs of the second group of the electrical devices based on the second starting operation.

6. The engine start controlling system according to claim 3, further including a notification means for notifying the user that it is possible to start the engine by making the second starting operation in a situation that at least one of the authentications for the device IDs of the second group of the electrical devices.

7. The engine start controlling system according to claim 1, wherein:

the operation unit includes a push switch and a brake switch, in the first starting operation, the push switch is pressed operation by the user while the brake switch is being biased by stepping a bake pedal, and in the second starting operation, at least one of the push switch and the brake switch is operated in a different way from that in the first starting operation.

8. The engine start controlling system according to claim 1, further including:

a pattern inputting means for receiving an operation pattern to the operation unit as the second starting operation; and a pattern storing means for storing the received operation pattern as the second starting operation, wherein the engine start controller:

includes a pattern comparison means for making a comparison between the stored operation pattern and an operation pattern inputted through the operation unit; and allowing, based on that the stored operation pattern and the inputted operation pattern is identical, the engine to start.

* * * * *